A. R. HARTMANN.
VEHICLE AXLE.
APPLICATION FILED SEPT. 23, 1913.
1,105,513.
Patented July 28, 1914.
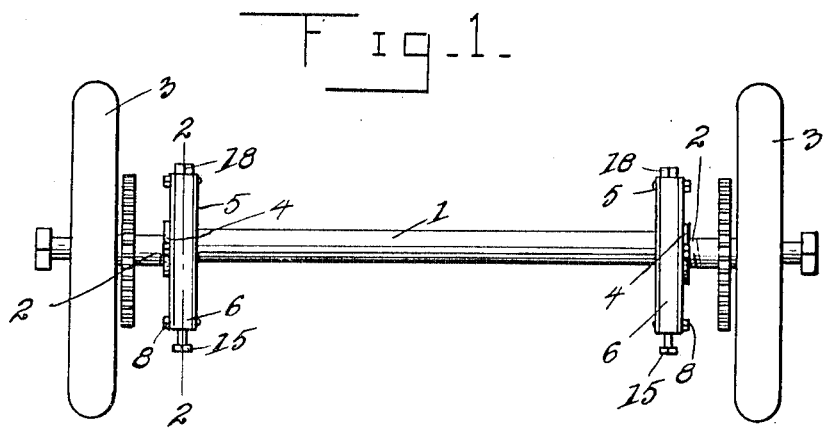
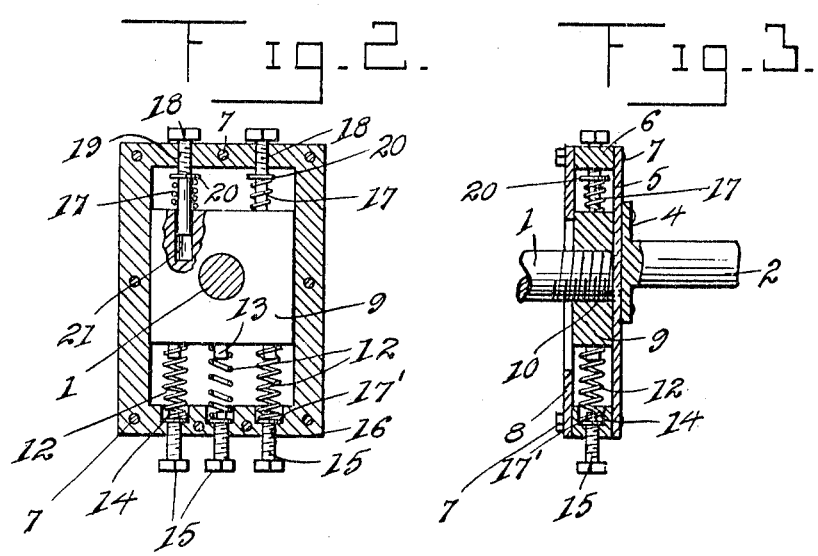
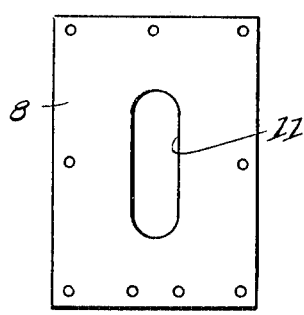
Witnesses
C. R. Bealle.
A. E. Johnson.
Inventor
A. R. Hartmann,
By
Attorney

UNITED STATES PATENT OFFICE.

ARTHUR R. HARTMANN, OF HOUSTON, TEXAS.

VEHICLE-AXLE.

1,105,513.

Specification of Letters Patent.

Patented July 28, 1914.

Application filed September 23, 1913. Serial No. 791,390.

*To all whom it may concern:*

Be it known that I, ARTHUR R. HARTMANN, a citizen of the United States, residing at Houston, in the county of Harris and State of Texas, have invented certain new and useful Improvements in Vehicle-Axles; and I do hereby declare the following to be a full, clear, and exact description of the invention, such as will enable others skilled in the art to which it appertains to make and use the same.

This invention comprehends improvements in vehicle axles, and relates more particularly to those of the type which are commonly known as shock absorbing.

One of the objects of the invention is to provide a vehicle axle of this nature which shall be of extremely simple construction, cheap to manufacture, strong and durable.

Another and more specific object of the invention is to provide an axle having a main central section and end pieces or stub axles connected by means of shock absorbing mechanism to the extremities of the main portion.

A further object of the invention contemplates the provision of a shock absorbing axle of this type which will render the use of pneumatic tires unnecessary and which will be more efficient in protecting the machine and its occupants from shocks and jars incidental to rough and uneven roads than any form of tire of spring wheel.

With these and other objects in view as will become more apparent as the description proceeds, the invention consists in certain novel features of construction, combination and arrangement of parts as will be hereinafter fully described and claimed.

For a complete understanding of my invention, reference is to be had to the following description and accompanying drawings, in which—

Figure 1 is a side elevation of my improved axle. Fig. 2 is a vertical sectional view taken on the plane of line 2—2 of Fig. 1, Fig. 3 is a central section taken on the plane at right angles to the plane of Fig. 2, and Fig. 4 is a detail side elevation of one of the plates forming a part of my invention.

Referring in detail to the drawing by numerals, 1 designates the central portion of an axle, 2 the end pieces or stub axles, which are connected to the central portion by means of my shock absorbing mechanism, and 3 designates the wheels carried by the stub axles. The shock absorbing mechanisms which connect each of the stub axles to the main axle, are identical in construction, and therefore it will be necessary to describe only one set, in order that a clear understanding of the invention may be had.

In the preferred embodiment of my invention, I form upon the inner end of the stub axles 2, a flange 4 to which is suitably secured a preferably rectangular plate 5. A rectangular frame 6, equal in size to the plate 5 is secured to the inner side thereof by means of suitable fasteners 7 and an inner plate 8 is connected to the inner side of the frame, as clearly shown in the drawings. The two plates and the frame 6 form a casing or housing, in which is slidably mounted a block or cross head 9 having a central transverse opening 10 in which is threaded, or otherwise secured, one end of the main axle 1. The inner plate is formed with a longitudinal slot 11, which allows for a vertical reciprocatory movement of the main axle relative to the stub axle 2.

The block 9 is cushioned on its downward movement by means of a plurality of spiral springs 12 which encircle at their upper ends studs 13 formed upon the lower edge of the block, and which are adapted to seat at their lower ends in sockets or recesses 14 formed in the lower bar of the frame 6. The tension of these springs may be varied by means of the adjusting screws 15 which thread through openings 16 and which carry collars 17' for engagement with the lower ends of the springs 12.

The block is cushioned on its upward movement by means of the springs 17 which are secured in position by means of the adjusting screws 18 which thread through openings 19 formed in the top bar of the frame 6. The upper ends of the springs 17 bear against collars 20 carried by the adjusting screws 18 and the lower ends of the springs engage the upper edge of the block. To allow for a maximum upward movement of this block, it is formed with upwardly opening recesses 21 into which the screws 18 project.

In use the main axle moves vertically with respect to the stub axle 2 and thus absorbs shocks which would disturb the occupants of the vehicle and tend to place a strain upon the various parts of the vehicle. The frame 6 guides the block in its movement and the adjusting screws permit the tension upon the springs to be changed to suit the weight of the vehicle and the road over which it is traveled.

From the foregoing description taken in connection with the accompanying drawings, it will be seen that I have provided a very simple shock absorbing axle which is of a very strong structure which will not tend to crystallize since it is formed in sections and which is adapted for use with any style of vehicle, but which is especially designed for motor vehicles.

While I have shown and described the preferred embodiment of my invention, it will be understood that minor changes in construction, combination and arrangement of parts may be made without departing from the scope and spirit of the invention as claimed.

Having thus described my invention, I claim:—

1. In a structure of the character described, a pair of stub axles, a plate secured to the inner end of each stub axle, a rectangular frame secured to each of said plates, a cover plate secured to each frame, a block vertically movable within each of the frames, a main axle having its ends rigidly secured to said blocks, the cover plates being longitudinally slotted to permit a vertical movement of the main axle relative to the stub axles, a plurality of spiral springs positioned above and below each of said blocks, and adjusting screws threaded through the frames into engagement with said springs, whereby the tension thereof may be varied.

2. In a structure of the character described, a stub axle, a housing formed on one end thereof, a block vertically movable within said housing, a main axle connected to said block, and adjustable means for cushioning the upward movement of the block.

In testimony whereof I affix my signature in presence of two witnesses.

ARTHUR R. HARTMANN.

Witnesses:
J. M. HEISER,
O. M. DUCLOS.